Feb. 11, 1941.   E. C. MYERS   2,231,545
VEHICLE
Filed Dec. 31, 1937   5 Sheets-Sheet 1

INVENTOR
EDWARD C. MYERS.
BY Emerson B. Donnell
ATTORNEY

Feb. 11, 1941. E. C. MYERS 2,231,545
VEHICLE
Filed Dec. 31, 1937 5 Sheets-Sheet 2

Fig. 2.

INVENTOR
Edward C. Myers.
BY Emerson B. Donnell
ATTORNEY

Feb. 11, 1941.  E. C. MYERS  2,231,545
VEHICLE
Filed Dec. 31, 1937  5 Sheets-Sheet 3

INVENTOR
EDWARD C. MYERS.
BY Emerson B. Donnell
ATTORNEY

INVENTOR
EDWARD C. MYERS,
BY Emerson B Donnell
ATTORNEY

Feb. 11, 1941.  E. C. MYERS  2,231,545
VEHICLE
Filed Dec. 31, 1937   5 Sheets-Sheet 5

INVENTOR
Edward C. Myers.
BY Emerson B. Donnell
ATTORNEY

Patented Feb. 11, 1941

2,231,545

UNITED STATES PATENT OFFICE 2,231,545

VEHICLE

Edward C. Myers, Kenosha, Wis.

Application December 31, 1937, Serial No. 182,825

12 Claims. (Cl. 298—1)

The present invention relates to trucks, and an object thereof is to generally improve the construction and operation of devices of this class.

A further object is to provide a self-propelled vehicle in which the bottom is unobstructed by propelling mechanism so that the load may be dumped through the bottom without interference with or from such mechanism.

A further object is to provide such a vehicle which may operate with equal speed and facility in either direction.

Further object are to provide: improved chassis and body construction; improved general arrangement of running gear and power plant and improved transmission facilities and features whereby a vehicle of this type can be equipped with tandem traction wheels or single axle traction wheels; and an improved tandem traction wheel attachment for such a vehicle.

Further objects are to provide a load-carrying vehicle characterised by low center of gravity and large ground clearance, and further objects are to provide various constructional details for facilitating the accomplishment of the above objects.

Further objects and advantages will appear from the following specification and accompanying drawings, in which.

Like reference characters have been applied to the same parts throughout the drawings and specification.

Figure 1:
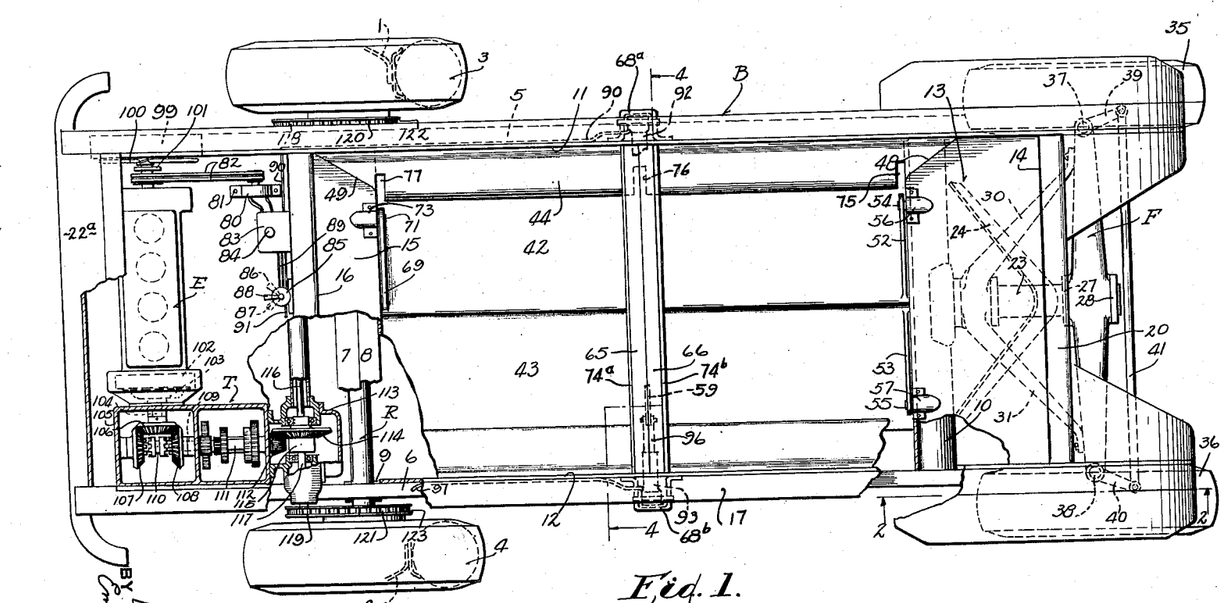
Fig. 1 is a top plan view of a vehicle embodying the invention, with parts broken away to show interior features.

As seen in Fig. 1, the invention is embodied in a truck including a body portion generally designated as B, a front axle generally designated as F, a rear axle generally designated as R, an engine E and transmission T, all related as more particularly described hereinafter. The truck is especially adapted for use in grading and excavating operations and the like, and embodies certain distinctive characteristics dictated by the requirements of such use.

A typical operation for such a truck would be receiving material from an elevating grader, shovel or the like, transporting it either a few hundred feet or several miles and dumping it. Since the majority of runs are relatively short, quick unloading is important, and therefore the truck is built with what might be termed a bottom dump, which can be operated without stopping and without spreading the load over a large area. Since speeds are relatively slow it is permissible to make the truck without springs, thus saving in overall height the amount of the ordinary up-and-down movement permitted by the springs on the conventional truck. The load is carried entirely between the axles, and, by locating all the propelling machinery outside of the space between said axles, the whole bottom of the load carrying space may be made to open for dumping the load without obstruction. Furthermore, by locating such machinery, including the differential gear, and also the drive shafts, entirely above the sills of the truck, ground clearance is provided to the full extent of the space beneath the axles. This and other features result in an exceptionally low center of gravity so that the truck is stable in side-hill operations, while the location of the driver's compartment gives him a full view of the whole machine for operating it forwardly or backwardly with equal facility. The transmission is so arranged as to provide the same speeds in reverse as in forward operation, so that the truck may "shuttle" back and forth between the grader and the dumping point without the necessity of turning around, this feature saving time and eliminating the need of providing space for turning at either the loading or dumping end of the trip.

Rear axle R may consist of a straight bar or member carried by wheels 1 and 2 (see also Fig. 2), provided respectively with pneumatic tires 3 and 4, preferably of the large low-pressure type, examples of which are well known. The axle is fixed directly to the sills 5 and 6 and cross members 7 and 8 in any suitable manner as by clamps 9—9, the result being a rigid connection of the axle to the under portion of the vehicle body. This type of axle gives maximum ground clearance, since there is no center enlargement for a differential housing, and the direct connection with the sills permits locating the body of the truck as near the ground as possible for a given clearance.

Sills 5 and 6 may consist of outwardly open channels, and they are suitably fixed to cross members 7 and 8 and extend forwardly to be fixed with a cross member 10, in the present instance tubular in form, and forming the forward boundary of the opening for dumping the load. Within the sills, side plates 11 and 12 form the sides of the load compartment, and lend their strength to that of the sills 5 and 6. The side plates are connected at the front by a bulkhead 13, inclined forwardly and upwardly for part of its length, and extending substantially vertically for a distance as at 14. A rear bulkhead 15 connects the side plates in the neighborhood of rear axle R, sloping rearwardly and upwardly, and having a substantially vertical portion 16, the chamber defined between the side plates and bulkheads constituting the load carrying, or body portion of the truck.

The side plates extend rearwardly beyond bulkhead 15 to form an operator's and engine compartment in which are located engine E, seat S, steering wheel W, etc., all removed from the load space. Obviously the operator has an unobstructed view of the whole truck from this position, and can easily "spot" it under a grader or other loading machine, and also determine exactly where the load is to be dumped.

Through the use of "remote control" clutch and gear shift (not shown) the operator may be located forward of the body i. e., at the end opposite the engine, within the contemplation of the broader aspects of the invention.

Side plate 12 is finished at its upper edge by a guard rail 17 which stiffens the plate, and together with sill 6 prevents the plate from bulging or distorting under the pressure of the load. Rail 17 extends from the lower rear corner of the plate up the rear edge at 18, and forwardly along the top edge, bending downwardly over one of the front wheels at 19. A similar rail strengthens plate 11, and a rail 20 is fixed across the top edge of bulkhead 13, bulkhead 15 being doubled back on itself at 21 to form a reenforcement. A tubular cross member 22 connects the rear of sills 5 and 6 and a plate or bulkhead 22ª closes the rear of the vehicle, protecting the operator and engine and adding stiffness to the whole structure.

Figure 2:
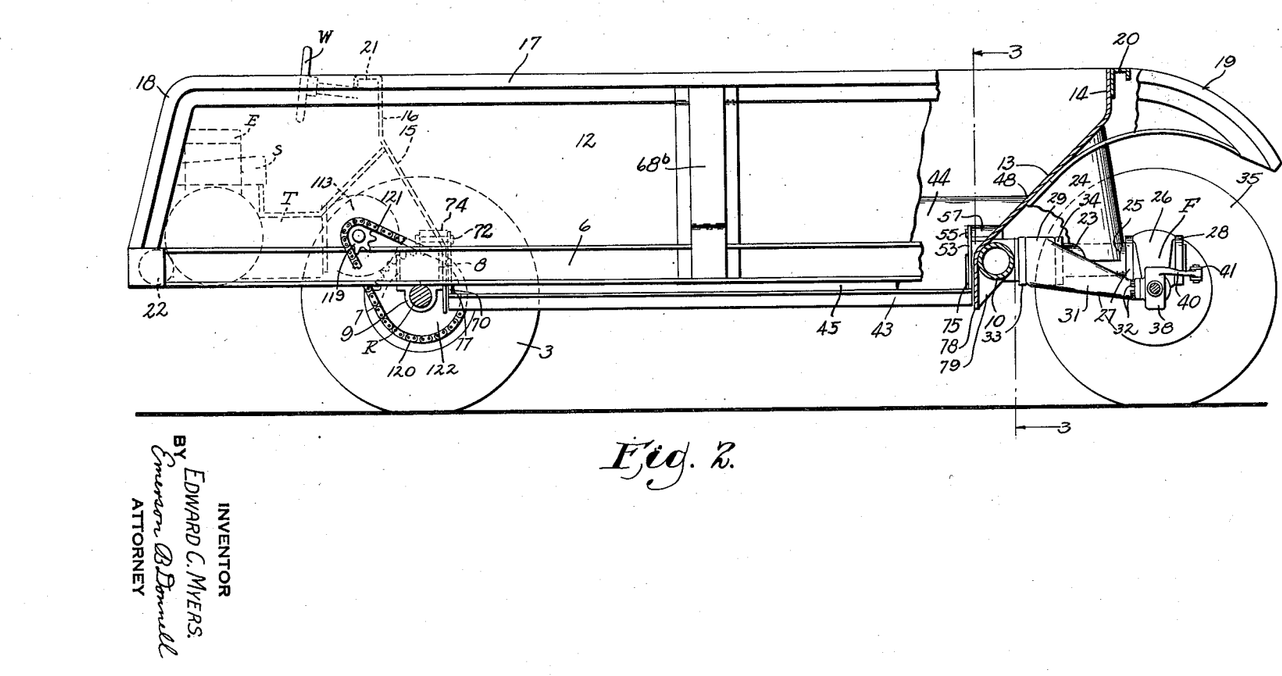
Fig. 2 is a side elevation of the same, partly in section on the line 2—2 of Fig. 1.

The above described structure includes the major elements of a very strong, light, and rigid combination chassis and body, the bottom opening being closed by suitable means hereinafter described, and the front axle being mounted for transverse rocking movement as follows:

Cross member 10, Figs. 1 and 2, has fixed therewith a forwardly projecting member or pivot 23, very solidly braced in position from bulkhead 13 by means of a bracing plate 24, which may be advantageously bent into a V shape and solidly fixed to the under side of the aforesaid bulkhead. At the lower edge of the bent portion, plate 24 has a cut-away portion 25 fitted about pivot member 23, the whole being united as by welding into a strong rigid unit. At its forward end pivot 23 has journaled thereon above mentioned axle member F, the same having an enlarged bearing portion 26 for rocking movement on the pivot to give the unsprung vehicle the requisite flexibility on uneven ground.

The axle is prevented from moving longitudinally of the pivot member by collars 27 and 28, and it has a brace or radius rod member journaled on pivot 23 close to cross member 10 comprising a hub portion 29 and arms 30 and 31 extending forwardly and attached to the axle as by bolts or the like 32. Hub portion 29 may be prevented from moving axially relatively to pivot member 23 by additional collars 33 and 34, thus assisting the collars 27 and 28 in resisting endwise components of road shocks. Axle F may accordingly rock freely, but cannot be otherwise displaced relatively to the truck body.

Axle F carries front wheels generally designated as 35 and 36, and the load is substantially equally distributed among the wheels by virtue of the pivotal connection of the front axle, even on rough ground.

Axle F is provided with steering knuckles 37 and 38 of suitable or well known type including steering arms 39 and 40, joined by a parallel rod 41 for maintaining the front wheels in proper relation to each other, and suitable or well known means (not shown) is provided for connecting steering wheel W with the steering mechanism for controlling the direction of movement, as will be understood. It is contemplated that a suitable or well known type of power operated steering mechanism may be incorporated in the connections, and, for equal steering characteristics in either direction of operation, the king pins may be set without rake, or vertically.

As above outlined, one of the important advantages in the particular construction of truck body and other parts herein described is the permitting of a free bottom dumping arrangement. Various means are contemplated for closing the bottom of the load-carrying space, one of which is shown in Figs. 1 to 4 inclusive. In this arrangement the bottom is closed by a plurality of leaves or doors generally designated as 42 and 43, in the present instance meeting longitudinally of the truck body.

Figure 3:
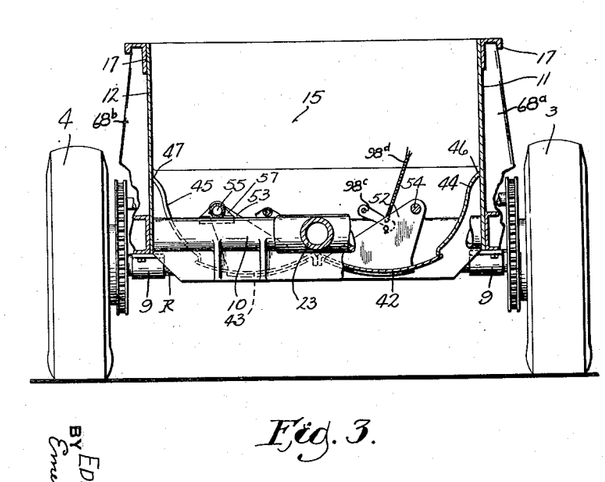
Fig. 3 is a compound vertical sectional view taken largely on the line 3—3 of Fig. 2, but with parts broken away.
Figure 4:
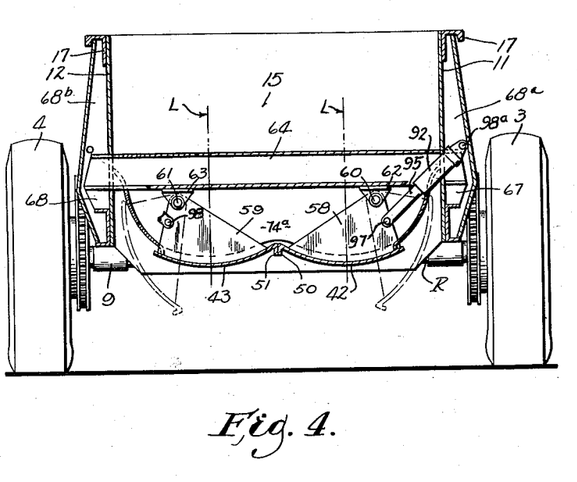
Fig. 4 is a vertical sectional view taken on the line 4—4 of Fig. 1.

In order to give the maximum ground clearance these doors are hinged at points upwardly displaced from their general planes and inwardly displaced from their outer edges, as more particularly shown in Figs. 3 and 4. Shield portions 44 and 45 are arranged longitudinally of the body B, fixed at their upper edges with the sides 11 and 12, respectively, at 46 and 47 and extending downwardly and away from the sides as shown, forming a hopper-like configuration near the bottom of the body portion, and being fixed with bulkheads 13 and 15 at 48 and 49. Doors 42 and 43 are conveniently made as segments of large cylinders, placed with their concave sides up, and contacting at their outer edges with the lower edges of the shield members, the doors meeting, as above noted along the longitudinal center of the bottom of the body, where they may have contacting portions of suitable type, for example down-turned flanges 50 and 51.

The doors are suspended at their forward ends by means of brackets 52 and 53 suitably pivoted at 54 and 55 to bearing blocks 56 and 57, fixed to the body structure substantially above the level of the doors themselves. Similar suspension means 58 and 59 support the mid-portions of the doors, being pivoted at 60 and 61 to suitable bearing members 62 and 63, fixed with and supported by a cross member 64, conveniently comprising a pair of suitable channel members 65 and 66 placed with their open sides together, the ends of the member extending through the sides 11 and 12 and resting upon saddles 67 and 68, supported on channels 5 and 6, conveniently within braces or battens 68ª and 68ᵇ, conveniently of inwardly open channel section, fixed on the outer surfaces of sides 11 and 12. These battens add to the total strength and stiffness of the structure.

The rear ends of doors 42 and 43 are similarly supported by brackets 69 and 70, pivoted at 71 and 72 to bearing blocks 73 and 74.

The space beneath members 65 and 66 is enclosed and protected from the load by closure plates 74ª and 74ᵇ fixed on the outer surfaces of the members so as to provide a substantially closed chamber beneath the cross member.

It is to be noted that the curved configuration of the door elements gives them a large amount of inherent rigidity so that they can support the load without distortion or gapping, and without other bracing than that afforded by the attachment of the brackets or suspension means 52, 53, 58, 59, 69 and 70, thus dispensing with a large amount of complication, excess weight and expense. Such panels as these may be used with their convex sides up under certain conditions, with equally good results, as will hereinafter appear.

Since the pivots 54, 60 and 71, and 55, 61 and 72, respectively, are in line, each door is free to swing about the center line defined by its group of pivots, and it may be swung upwardly and sidewardly, as shown in dotted lines particularly in Fig. 4, the doors traveling bodily, largely into the spaces provided between shield members 44 and 45 and sides 11 and 12, and projecting only a little below their position when closed. It is thus possible to dump the load by allowing the doors to open, which they will do if released owing to the outward thrust caused by the displacement of the pivots 61 etc., outwardly from the plane of the center of downward pressure of the load, L, on each door, as clearly indicated in Fig. 4, and either drive on without stopping, or dump and back off of the resulting pile without any substantial dragging of the under portions of the truck on the dumped material. Shield portions 44 and 45 are slotted as at 75, 76 and 77 for the passage of the brackets supporting the doors.

Bulkhead 13 is extended downwardly at 78 in close proximity to doors 42 and 43 and brackets 52 and 53 to complete the closure formed by the shields and doors, and braces 79—79, extended to cross member 10, prevent deflection of the portion by pressure of the contents of the truck or other forces. An effective closure is thus provided for the body, and which is easily and rapidly operated by power, owing to the convenient location of the engine directly on the truck.

Various means are contemplated for so controlling the doors, it being necessary, as above suggested, merely to release the doors for opening movement, power means being required only for forcing the doors into closed position.

As a convenient arrangement a hydraulic mechanism is shown in the present instance, a suitable pump 80 being fixed in the engine compartment as by bolts 81, and driven from engine E by suitable means such for example as belts 82—82, the pump being supplied with fluid from a reservoir 83 having a filler neck 84, a control valve 85 of suitable or well-known type being supported within convenient reach of the driver, and having, for example, dump, close, and neutral positions, 86, 87, and 88 respectively, the valve being connected with the pump and reservoir by suitable piping 89, and other pipes 90 and 91 leading to rams or cylinders 92 and 93, mounted diagonally in cross member 64, and having rams 95 and 96. The details of such apparatus being well known, it is considered unnecessary to describe these elements further.

Rams 95 and 96 are directed downwardly and connected by suitable pivot pins or the like 97 and 98 with supporting members 58 and 59 below their pivots as shown, the cylinders 92 and 93 being pivotally secured to braces 68ª and 68ᵇ respectively, as by pins or the like 98ª. Pipes 90 and 91 are sufficiently flexible to provide for the slight amount of movement necessary in the cylinders.

Pressure in the cylinders will accordingly urge members 58 and 59, and accordingly doors 42 and 43, toward closed position, and a convenient way to operate the system is to so connect valve 85 as to turn fluid from pump 80 into pipes 90 and 91 when it is desired to close the doors, the valve then being placed in neutral position to hold the fluid in the cylinders 92 and 93, while bypassing the fluid from the pump to reservoir 83, thus holding the doors forcibly and tightly closed, while avoiding continuous use of power by the pump, the valve operating to connect pipes 90 and 91 to reservoir 83 to allow free backward movement of the rams when it is desired to dump, the load forcing the doors to the open position shown in dotted lines in Fig. 4, and discharging the contents of the cylinders to the reservoir.

Latches as 98ᶜ, Fig. 3, may be provided if desired, where necessary for holding the doors shut until released by pulling a cable 98ᵈ or the like, thus providing holding means at as many points as required for the load, and making it unnecessary to depend entirely upon pressure in the hydraulic system.

The propelling mechanism is novel in certain respects as will be set forth. Engine E may be of any suitable type, and as such engines are well known it will not be further described except to say that a radiator 99 of suitable construction is mounted, conveniently, in the side of the vehicle and a fan 100, suitably driven, as by a belt 101 is arranged to impel air through the radiator for well-known purposes.

The engine has a fly-wheel 102 embodying a clutch generally designated as 103, which, being of any suitable or well known type need not be further described. A driven shaft 104 extends from the clutch into a housing 105 and drives a bevel gear 106 engaging other bevel gears 107 and 108 journaled on a shaft 109 to which either of the last mentioned gears may be clutched by means of a jaw, or other suitable clutch 110. With clutch 103 engaged, shaft 109 may therefore be driven with equal speed in either direction.

Shaft 109 extends into or drives above mentioned gear-set or transmission T, which may be substantially standard or of well known type, except that the usual reverse idler and its associated parts are not necessary, the spline shaft 111 of the transmission driving a bevel pinion 112 in a differential housing 113. Pinion 113 drives a ring-gear 114, carried by a differential gear 115 of suitable or well-known type from which lead drive shafts 116 and 117, terminating respectively in sprockets or other driving means 118 and 119, driving, through chains 120 and 121, suitable larger sprockets 122 and 123. Since there is no relative movement between axle R and the body of the truck these chains may be run on much shorter centers than is common, and may be replaced by gears, within the contemplation of the invention.

As clearly shown in Fig. 2, differential housing 113, transmission T, and in fact all parts of the propelling mechanism are located above the bottom of the engine compartment so that there is no obstruction to movement of the truck caused by dragging of transmission parts on the dumped load. Since dumping is substantially instantaneous, and done while the vehicle is moving, any downwardly projecting parts would receive hard blows, and cause trouble through obstructing the passage of the vehicle over the dumped load.

Since the weight is carried on rear axle R and not on the drive shafts 116 and 117 or their housings, great strength and expensive construction is not required in these drive shafts or their housings. Also, owing to the placing of the reverser, constituted by bevel gears 106, 107 and 108 between clutch 103 and transmission T, or in other words ahead of transmission T, the speed changes provided by the transmission are equally available and effective in either direction of travel of the vehicle, so that it is in effect a double-ended unit, operating equally well in either direction. This feature renders the vehicle adaptable for uses other than hauling loads of earth and the like, it being possible, for example, to attach a snow-plow to the end of the vehicle occupied by the engine compartment, which then becomes the front, the weight of the plow and snow thereon tending to hold down the drive wheels and assist in obtaining sufficient traction. Also, the traction wheels then operate closely behind the plow so that there is maximum resistance against lateral skidding of the angled snow plow blades, and there is no opportunity for an accumulation of snow under the traction wheels to cause a digging in or jumping effect.

Figure 5:
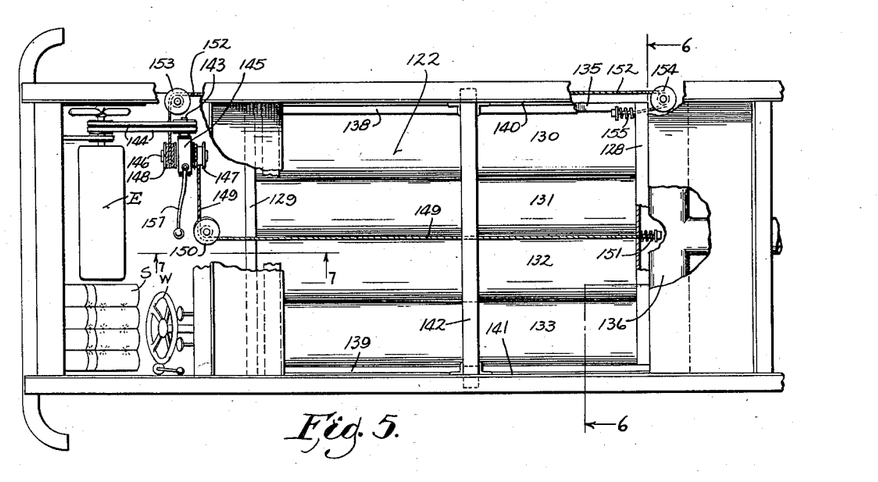
Fig. 5 is a plan view of a modified type of vehicle embodying certain features of the invention, with parts removed.
Figure 6:
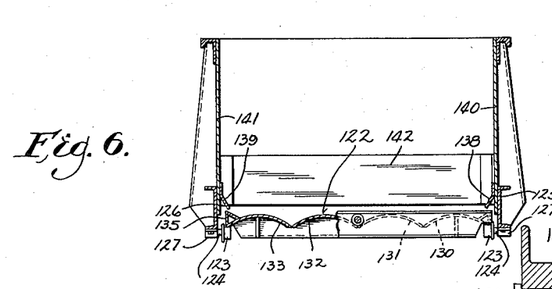
Fig. 6 is a vertical sectional view on the line 6—6 of Fig. 5.

A modified form of closure for the bottom of the load compartment is shown in Fig. 5, in the shape of a suitably braced plate-like element generally designated as 122, Fig. 6, movably supported, for example on rollers 123—123 carried on pintles 124—124 fixed to channel members 125 and 126 by suitable clamps 127—127 or the like, the whole closure being moved bodily out from under the load when desired by suitable power means.

Although the closure may be made in various ways, it conveniently comprises a front channel member 128, a rear channel member 129 (see also Fig. 6) and a plurality of longitudinal plates 130—131—132—133, adjacent edges being connected, and the plates being connected at their ends to the channels, and preferably bowed or arched slightly in transverse section. The arching gives the plates a large amount of longitudinal stiffness, in fact sufficient so that the closure so made needs no further bracing. The edges of the terminal plates, 130 and 133, are turned upwardly as at 135 to form suitable reenforced edges to run on the rollers, although other details are contemplated as equivalent.

Front channel 128 closes against a front cross member 136, corresponding to above mentioned cross member 10, and when the closure is in this position, rear channel member 129 is disposed beneath and slightly to the rear of a cross member 137, corresponding to above described cross member 7, and forming the rear boundary of the opening in the bottom of the load carrying compartment. With the closure overlapping to this extent there is no need for the channel to seat on the cross member, and in fact a small space may be left between the members for a purpose to appear, although other details of construction are contemplated at this point.

To prevent leakage of the load past the sides of the closure and onto the rollers 123, shield plates 138 and 139 are fixed with the sides 140 and 141 and extend inwardly slightly past the upturned edges of the above mentioned terminal plates 130 and 133. The sides 140 and 141 are braced by a cross member 142 against distortion under the outward pressure of the load.

Various means are contemplated for moving the closure, it being convenient to operate it by power for the reason that the engine E is located directly on the vehicle, as noted in the first-described embodiment. For this purpose a worm shaft 143 is driven by belts 144—144 from engine E, suitable pulleys being interposed as will be understood. Worm shaft 143 drives, through a worm wheel 143ª in a casing 145, a shaft 146, journaled in sleeves 146ª and 146ᵇ, and carrying, respectively, windlasses 147 and 148. A cable or the like 149 leads from windlass 147 about a suitably anchored sheave 150, and forwardly through the above mentioned space between cross member 137, along the top of closure 122 and is anchored by suitable cushioning means 151 to front channel member 128. Cable 149 runs onto the lower side of windlass 147, while cable 152 runs onto the upper side of windlass 148. Accordingly, if windlass 147 is rotated in a proper direction, cable 149 will be wound thereon, while if windlass 148 is rotated in the same direction (windlass 147 being free) cable 152 will be wound on windlass 148.

Figure 8:
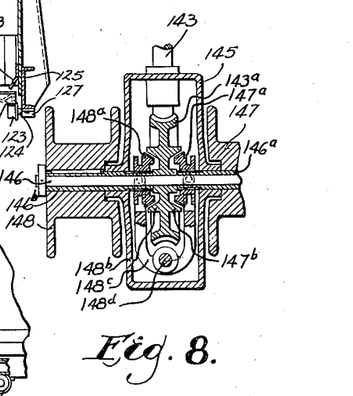
Fig. 8 is a horizontal sectional view of certain mechanism indicated in Fig. 7, taken on the line 8—8 of Fig. 7.

This may be accomplished in various ways, for example, sleeves 146ª and 146ᵇ may be journaled in housing 145 and connected respectively with windlasses 147 and 148, the sleeves carrying, slidably keyed, or similarly secured thereon clutch members 147ª and 148ª. These clutch members are engageable alternatively with clutch portions 147ᵇ and 148ᵇ on worm wheel 143ª, which, as above suggested, is constantly rotating. The clutches may be shifted by a shipper or fork element 148ᶜ having arms engaging grooves in the clutches in well known manner as shown. Fork 148ᶜ may be fixed on a vertical shaft 148ᵈ journaled in the casing and actuated as described below.

Rotation of windlass 147 will accordingly wind cable 149 thereon and pull closure 122 backwardly, opening the entire bottom of the load-carrying space.

At the same time cable 152 is paid out from windlass 148, which is free to rotate with sleeve 146ᵇ, past a suitably anchored sheave 153 forwardly along the side of the vehicle, conveniently within the protection of channel 125, about a sheave 154 and rearwardly to a cushioned connection 155 with above mentioned front channel member 128. Clutching of windlass 148 to worm wheel 143ª exerts a pull on cable 152 and pays out cable 149 in a similar manner, thus returning the closure to closed position.

Figure 7:
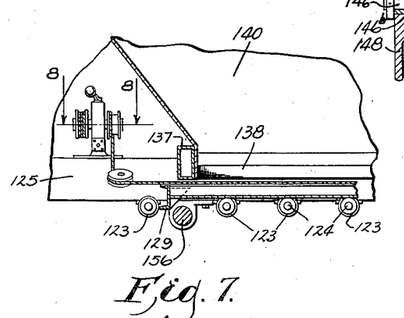
Fig. 7 is a vertical sectional view taken on the line 7—7 of Fig. 5.

Since rear axle 156 is located entirely below channels 125 and 126, closure 122 can pass between it and cross member 137, as clearly shown in Fig. 7, and may project somewhat beyond the rear end of the engine compartment when the proportions of the particular vehicle make this necessary.

The shipper 148c in casing 145 may be controlled by means of a lever 157 fixed on vertical shaft 148d and extended to a position within convenient reach of the operator.

It will be understood that the same axles, wheels, drive mechanism etc., are used with the embodiment of Fig. 5 as with that of Fig. 1, and no further description of these elements is considered necessary at this point.

Figure 9:
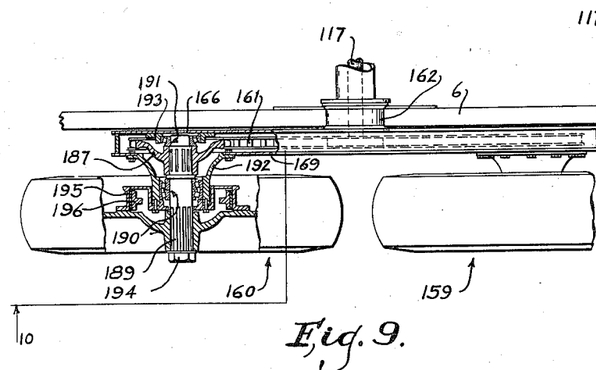
Fig. 9 is a plan view of a modified type of wheel mounting or suspension for the vehicle with parts broken away to show interior features.

It is desirable, however, under certain conditions, to provide more ground engaging or traction surface at the rear of the vehicle than is furnished by the wheels 1 and 2. For this purpose either of the above described types of vehicle may be built with a tandem rear wheel arrangement as shown in Figs. 9 to 11 inclusive.

Figure 10:
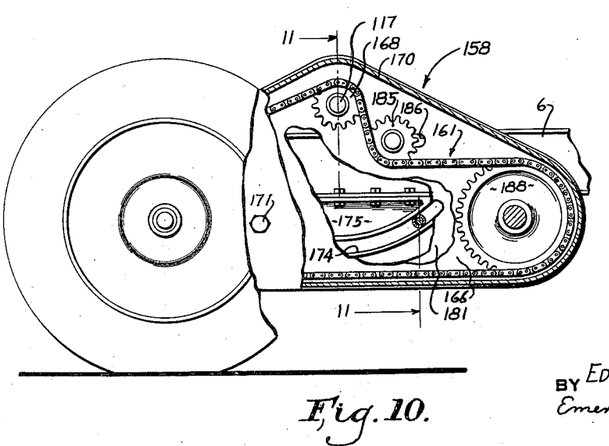
Fig. 10 is a vertical sectional view substantially on the line 10—10 of Fig. 9 with parts broken away.
Figure 11:
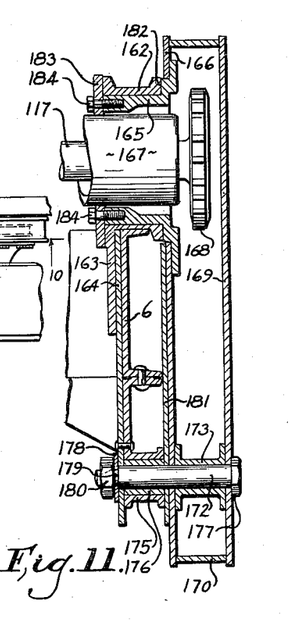
Fig. 11 is a vertical sectional view taken on the line 11—11 of Fig. 10.

An elongated housing generally designated as 158 is pivoted to each side of the body portion of the vehicle on the extended center lines of shafts 116 and 117, respectively, (Fig. 1), bearing forward and rear wheels generally designated as 159 and 160, the housing rocking to follow ground inequalities, both wheels being driven through a chain 161, as indicated in Fig. 10. In this way increased traction is secured and there is less tendency for the springless vehicle to bounce, the effect of road shocks being approximately halved by the rocking action of the housing.

The latter is journaled in a bearing or box portion 162 fixed rigidly with channel member 6, having a flange 163 fixed therewith for facilitating such attachment. A reenforcing plate 164 may be interposed between the channel and flange to further strengthen the connection. Housing 158 has a hollow pintle or trunnion 165 fixed with the inner wall 166 thereof, and journaled in above mentioned box 162, and forming a pivotal connection or guide for the housing on the vehicle, although the weight of the vehicle is preferably carried otherwise than entirely on this pintle, as will appear. A special housing portion 167 for above mentioned shaft 117 projects through the trunnion and a sprocket 168 carried by the shaft rotates on the center-line of oscillation of the trunnion and housing, an equivalent construction being used on the other side of the vehicle, as will be understood.

Housing 158 includes also outer wall 169, and an enclosing strip 170, the whole being fixed together in any suitable manner into a rigid box-like structure for carrying the weight and enclosing the driving mechanism. To obviate a tendency toward misalignment and to carry part of, or most of the weight of the vehicle, bolts 171 and 172 are fixed in the housing as by being held in spools or the like 173 and projecting inwardly toward the vehicle, the bolts floating in the spools and traveling in a slot 174 in a brace member 175, sleeves 176 being arranged on the bolts to provide a rolling contact in slot 174 to reduce friction and wear and to provide a replaceable element for ready restoration of the device to efficient condition when worn. Slot 175 is formed on a radius with shaft 117 as a center so that housing 158 may rock about the shaft and housing 167 as a center while the weight is carried by bolts or pins 171 and 172 by their engagement with slot 174. In this way it is possible to avoid the necessity of a strong and expensive housing at 167, the stress of the weight, side thrust, turning etc., being taken entirely on the pins 171 and 172 and, if desired, on pintle 165 and box 162. The housing is thus guided at three widely spaced points, end-play in the pins being prevented by heads such as 177 engaging plate 169, and washers or the like 178 clamped against a shoulder 179 as by nuts such as 180. This construction allows the pin to float and furnishes an abutment for the washer to avoid clamping the movable housing rigidly against the stationary member 175.

A plate 181 may be interposed between housing 158 and member 175 to provide additional surface against which the housing may move, and end-play in pintle 165 is prevented by a shoulder 182 and a cap plate or ring 183 fixed on the pintle inwardly of the housing, as by screws 184—184. Other constructional details are contemplated as equivalent, but an important feature of the invention is the supporting, or tying of the oscillating housing to the vehicle body at three widely separated points whereby to firmly fix the units together and to minimize the stress on any one of the attaching means when the vehicle is operated on a side-hill, turned sharply, etc., which operations throw severe and often damaging stresses on tandem wheel arrangements of known types.

Chain 161 passes over above mentioned sprocket 168, and under an idler sprocket 185 suitably pivotally mounted in housing 158, and preferably adjustable, for example in a slot 186, whereby the chain may be adjusted as to tightness. The course of the chain as guided by idler sprocket 185 causes it to wrap sprocket 168 in a desirable manner, difficult to obtain in known arrangements. Chain 161 also engages and operates sprockets 187 and 188, associated respectively with above mentioned wheels 160 and 159.

Since the construction of the stub axles for the wheels and their mountings are identical, it will be necessary to describe only one. Referring to Fig. 9, wheel 160 is mounted on a stub axle 189 carried in anti-friction bearings of suitable or well-known type 190 and 191, carried respectively in a bell housing 192, fixed with plate 169, and a fitting 193 fixed on plate 166. The wheel is retained on the axle by a suitable nut or the like 194 and the axle is splined if desired for rigid attachment of the wheel and sprocket 187.

The wheels may be fitted with brake drums as 195 within which operate brake shoes of suitable or well-known type 196, operated in any suitable or well-known manner.

Other necessary details of construction are to be understood as of well-known or suitable form, but are not further described because they form no part of the present invention, the present disclosure covering the essentials of an operative device embodying the invention, which, however, is not to be taken as limited by anything in this description, or in fact in any manner except as defined in the following claims.

The above being a full description of an illustrative device embodying the invention, what is claimed as new and desired to be secured by Letters Patent of the United States is:

1. In a bottom dump truck body, a movable closure therefor including a panel disposed across the open bottom of the truck body, an arm extending from the panel upwardly adjacent to the end of the body and pivoted at a point upwardly displaced from the plane of said open bottom whereby said closure will swing bodily sidewise away from said opening for dumping the contents of said body, and a fluid pressure cylinder positioned to urge the panel across the opening and to maintain it in closed position, said cylinder including a ram element and a cylinder element, one of said elements being pivoted to said body and the other element being pivoted to said arm.

2. In a bottom dump truck, a body including a pair of sills and having a bottom opening between the sills, an axle fixed with the sills and displaced from the opening, a wheel system carried by the axle and supporting it and the vehicle, a pivot extending forwardly from said body from a point between said sills, a second axle mounted on said pivot for lateral rocking movement, a wheel system carried by said second axle, and a closure for the opening arranged to move to one side away from the opening whereby to avoid obstructing movement of the truck by contact of the closure or axle with material dumped through said opening.

3. In a bottom dump truck body, a pair of load carrying sides, shields arranged within and spaced from the sides, a movable closure for the open bottom including a panel disposed thereacross, an arm extending from the panel upwardly adjacent to the end of the body and pivoted at a point upwardly displaced from the plane of said open bottom and outwardly displaced from the center of pressure of the load on said panel, releasable means arranged for holding said panel in position across said open bottom, the pivot point being so chosen that the closure will swing bodily sidewise away from said opening and upwardly into the space between one of the shields and the adjacent side for dumping the contents of said body.

4. In a double ended motor vehicle the combination of a body including sides and a bottom defining desired ground clearance and including drive wheels, an engine, a reverse gear arranged to be driven by the engine, a change speed gear arranged to be driven by the reverse gear, a differential gear arranged to be driven by said change speed gear, said engine and said gears being located entirely above said bottom, and connections from the differential gear arranged to actuate the drive wheels of the vehicle, whereby said vehicle may operate with equal speed and facility in either direction.

5. In a double ended motor vehicle, the combination of a body having sides and a bottom defining desired ground clearance, drive wheels, an engine, a clutch arranged to be driven by the engine, a reverse gear arranged to be driven by the clutch, a change speed gear arranged to be driven by the reverse gear, a differential gear arranged to be driven by said change speed gear, said engine and said gears being located entirely above said bottom, and connections from the differential gear arranged to actuate the drive wheels of the vehicle.

6. In a bottom dump truck, a body including side members and a movable bottom, a load supporting axle rigidly fixed with the body substantially on a level with the bottom, a wheel system carried by the axle for supporting it and the body, a power plant carried by the body and wholly above the bottom thereof, a differential gear carried on the body above said axle, a housing for the differential gear, drive shafts extending from the differential gear in the housing, said housing being entirely above said bottom and said axle whereby to avoid striking any part of material dumped from said body beneath said axle, and driving connections between said drive shafts and said wheel system.

7. In a load carrying vehicle, the combination of supporting wheels, a body portion carried by the supporting wheels and having a load carrying space and a bottom dump opening, said body having a bottom portion positioned to define the desired ground clearance, a closure for the opening, means for actuating the closure for dumping the contents of the body between the wheels, and driving means disposed entirely removed from said load carrying space and above said bottom so as to avoid encroaching upon said opening or interference with the load when dumped, and a reverse gear in series with the driving means for driving the vehicle with equal speed and facility in either direction.

8. In a bottom dump truck, a body including load carrying side members and a bottom, defining desired ground clearance, a load supporting axle rigidly fixed with the side members, a wheel system carried by the axle for supporting it and the body, a power plant carried by the body entirely above said bottom, a reverse gear, a change speed gear, and a differential gear carried on the body, all above said bottom, housing means for the several gears, drive shafts extending from the differential gear and arranged for driving the wheels of said wheel system, said housing means being entirely above said bottom and within said body whereby to avoid striking material dumped from said body beneath said truck, and driving connections between said drive shafts and said wheel system.

9. In a bottom dump truck, the combination of front and rear wheel systems, a load carrying body portion arranged between the wheel systems, occupying the majority of the space available therebetween and extending substantially beyond one of said wheel systems, a power plant including an engine and transmission means located beyond said wheel system relatively to said load carrying space and entirely within said body, said engine being disposed transversely of said truck whereby to avoid excessive overhang of the weight thereof, a shaft extending from the engine longitudinally of the truck and a reverse gear driven from the engine and constituted to transmit motion to said shaft, transversely of the engine.

10. In a bottom dump truck, the combination of front and rear wheel system, a load carrying body portion having sides and a bottom arranged between the wheel systems and occupying the majority of the space available therebetween, said sides and bottom extending beyond one of said wheel systems, a power plant including an engine and transmission means located beyond said wheel system relatively to said load carrying space and entirely within the extended sides and bottom of said body, said transmission means being disposed lengthwise at one side of the truck and said engine being disposed transversely of the truck and connecting with the transmission, a reverse gear driven from the engine, said reverse gear being constituted to transmit motion transversely of the engine and to said transmission means whereby to space said engine a short distance only beyond said wheel system relatively to said load carrying body.

11. In a bottom dump truck body, a pair of load carrying sides, shields arranged within and spaced from the sides and joined at their upper margins with said sides, panels disposed across the open bottom of the truck body and positioned to cooperate with the shields to seal the open bottom of said body, arms extending from the panels upwardly adjacent to the ends of the body and pivoted at points upwardly displace from the plane of said open bottom whereby said panels may swing bodily sidewise and upwardly into the spaces between said sides and said shields for dumping the contents of said body.

12. In a bottom dump truck body, a movable closure therefor including a panel disposed across the open bottom of the truck body, arms extending upwardly from the panel and pivoted at points upwardly displaced from the plane of said open bottom and outwardly displaced from the center of pressure of the load on said panel, fluid pressure means positioned between the body and one of said arms for urging said panel into position across said open bottom and maintaining it there against the pressure of the load in said body, the pivot points being so chosen that the closure will swing bodily sidewise away from said opening for dumping the contents of said body.

EDWARD C. MYERS.